Feb. 3, 1953 E. M. MARTIN 2,627,299
ADJUSTABLE BUS SEAT
Filed Dec. 3, 1947 2 SHEETS—SHEET 1
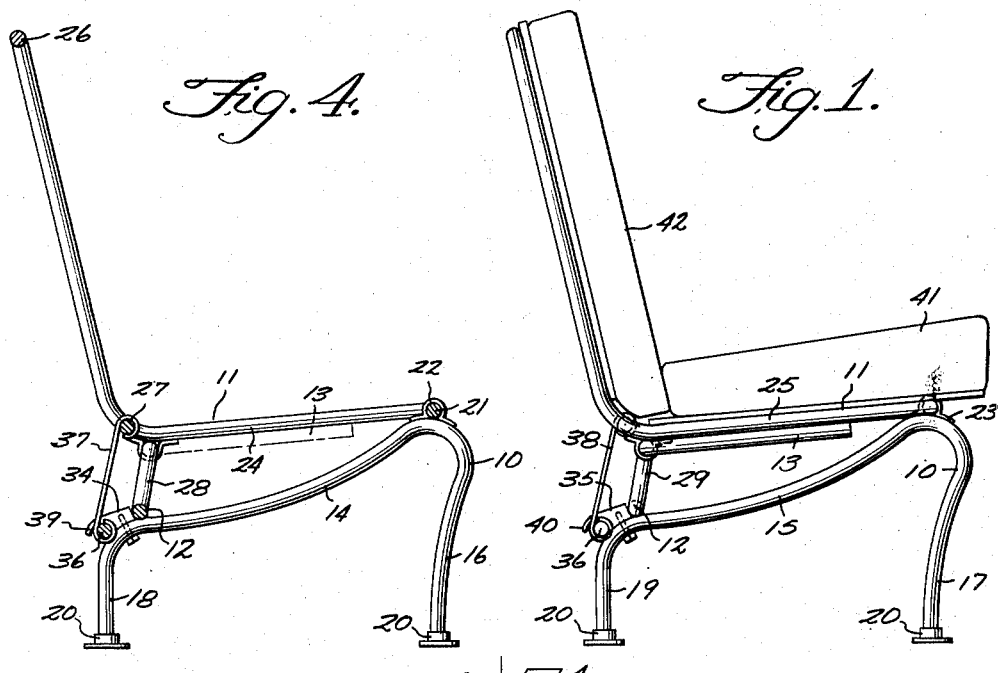
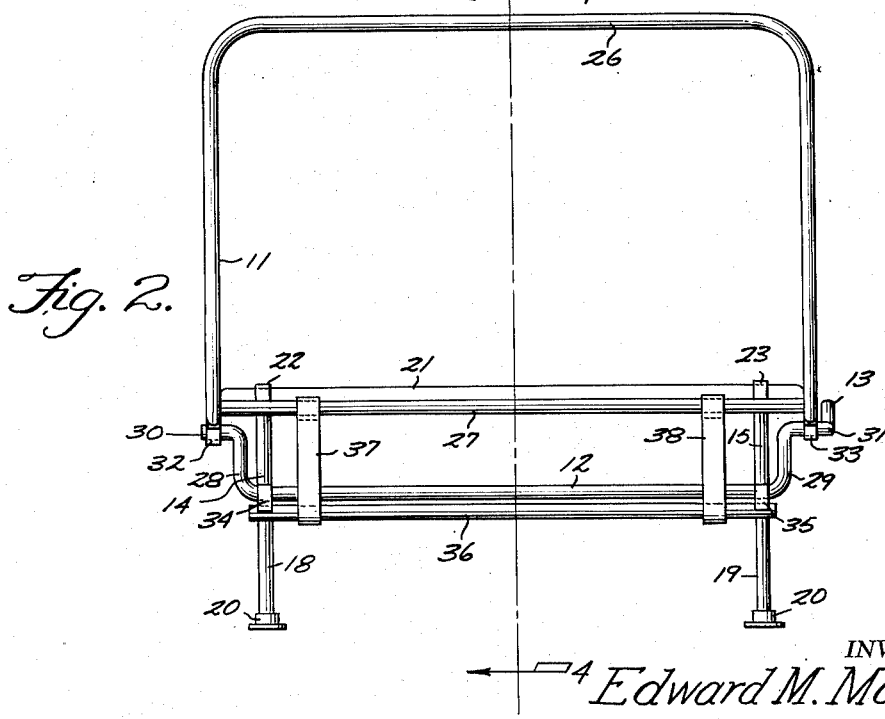
INVENTOR.
Edward M. Martin,
BY Victor J. Evans & Co.
ATTORNEYS

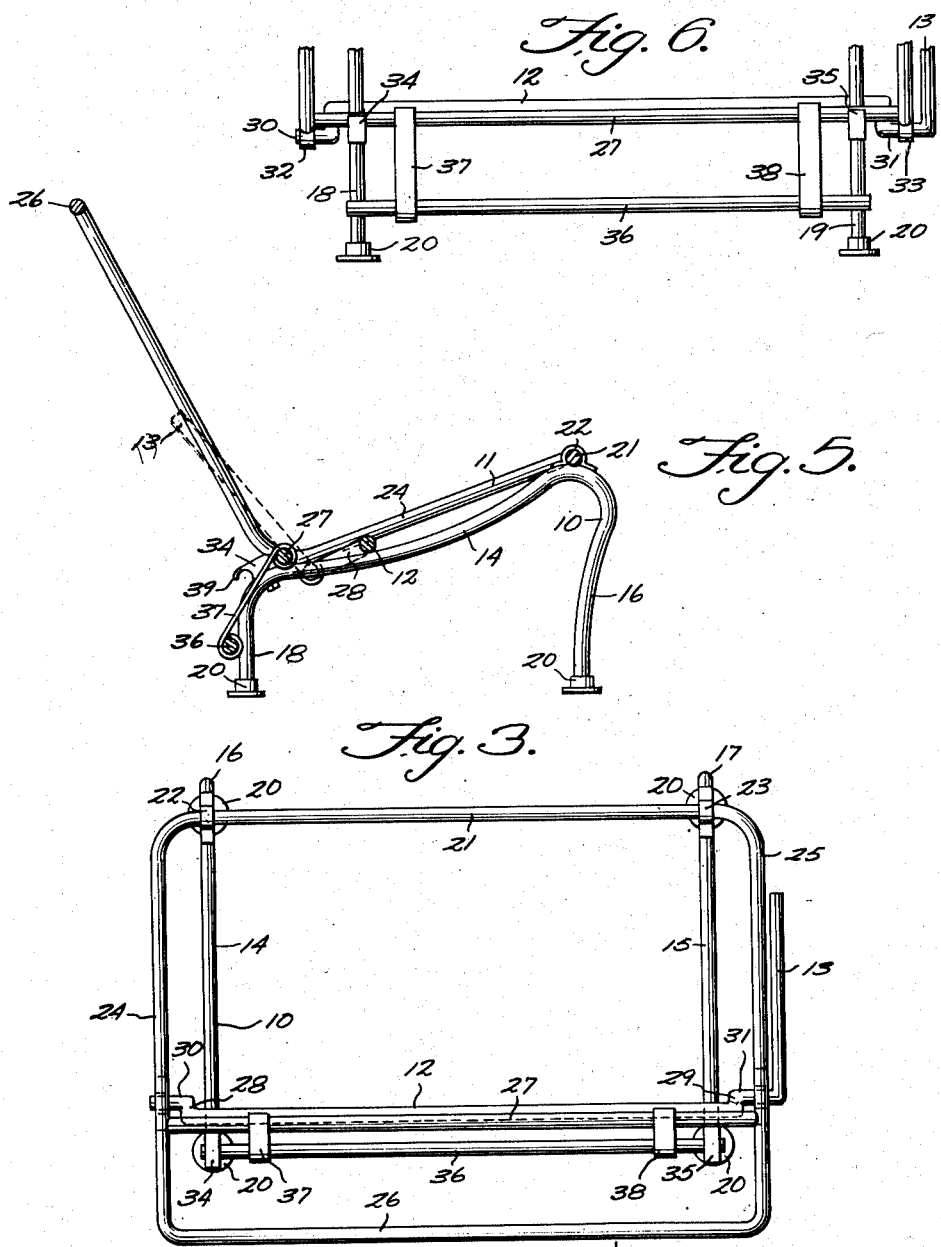

Patented Feb. 3, 1953

2,627,299

UNITED STATES PATENT OFFICE 2,627,299

ADJUSTABLE BUS SEAT

Edward M. Martin, Jacksonville, Ark.

Application December 3, 1947, Serial No. 789,419

4 Claims. (Cl. 155—120)

This invention relates to adjustable reclining seats such as used in busses and particularly school busses where seats of comparatively simple construction are desirable, and in particular the invention includes a seat supporting frame and a seat structure wherein the seat structure is hinged to the frame at the front and supported therefrom at the back by a U-shaped lever that is adapted to either drop or elevate the back to adjust the position of the seat.

The purpose of this invention is to improve the comfort of bus seats by providing means whereby the seats may be actuated to reclining position by a simple lever.

Various devices have been provided for adjusting seats of busses for long distance riding to reclining positions but seats of this type and the adjusting means therefor are comparatively costly and, therefore, are not adapted for the average school bus. However, especially in rural communities, school busses operate over comparatively large areas and where children are used as farm help it is desired to make riding as comfortable and restful as possible. With this thought in mind this invention contemplates a bus seat that may readily be adjusted to reclining position in which the parts are of simple and at the same time rugged construction whereby they are adapted to withstand the abuse that they will receive.

The object of this invention is, therefore, to provide means for mounting a seat on a supporting structure wherein the back and rear part of the seat may readily be dropped to position the seat for reclining.

Another object of the invention is to provide means for readily dropping the rear portion of a seat that may be actuated by a simple lever.

A further object of the invention is to provide an adjustable seat that is particularly adapted for school busses which is of a simple and economical construction.

With these and other objects and advantages in view the invention consists of the new and novel combination, construction, and arrangement of parts as hereinafter more fully described, set forth in the claims appended hereto, and disclosed in the accompanying drawings, forming part hereof, wherein:

Figure 1 is a view showing an end elevation of the seat positioned in the usual riding position.

Figure 2 is a view showing a rear elevation of the seat.

Figure 3 is a plan view of the seat structure.

Figure 4 is a vertical section through the seat structure taken on line 4—4 of Figure 2.

Figure 5 is a section similar to that shown in Figure 4 illustrating the seat structure in the reclining position.

Figure 6 is a rear elevation of the seat structure with the structure in the reclining position and with the upper part thereof broken away.

Referring now to the drawings wherein like reference characters indicate corresponding parts the bus seat of this invention includes a supporting frame 10, a seat frame 11, and a U-shaped support 12 which is actuated by a hand lever 13.

The frame 10 comprises arcuate upper bars 14 and 15 supported at the front by posts 16 and 17, and at the rear by short posts 18 and 19. The ends of the posts are provided with flanges 20 by which they may be screwed to the floor or any suitable flat surface.

The seat frame 11 is formed with a front bar 21 that is pivotally mounted on the forward ends of the bars 14 and 15 by bearing clips 22 and 23, and this bar is bent to form side bars 24 and 25 which extend backward to the back of the seat and then upward to provide supporting means for the back of the seat. The upper ends of the bars 24 and 25 are connected by a cross bar 26, and an intermediate cross bar 27 is provided at the lower end of the back.

The support 12 is formed as illustrated in Figure 2 with upwardly extending arms 28 and 29 having outwardly extending ends 30 and 31 and the hand lever 13 is formed on the outer end of the end 31, as shown. The support is mounted through the ends 30 and 31 on the under side of the side bars 24 and 25 in bearing clips 32 and 33, and with the lever 13 forced downward, as shown in Figure 1, the support 12 rides upon the upper surfaces of the bars 14 and 15 thereby holding the seat upward. When it is desired to lower the back of the seat the hand lever 13 is pulled upward so that it moves the bar or support 12 forward to the position shown in Figure 5, and the back of the seat is dropped to the reclining position as shown.

The upper surfaces of the bars 14 and 15 are provided with lugs or blocks 34 and 35 which are positioned to limit the backward movement of the support 12, as shown in Figures 1 and 4, and with the blocks positioned behind the center of support of the support 12 the support will remain in the position of holding the seat in the upward position until actuated to the forward position by hand.

A foot rest 36 is suspended from the intermediate cross bar 27 by straps 37 and 38 and as the seat frame is moved upward by the support 12 the foot rest engages with the rear ends of the blocks 34 and 35 and is held under projecting fingers 39 and 40, as shown in Figures 1 and 4, thereby coacting with the support 12 to retain the seat in the upper position.

The seat may be provided with cushions 41 and 42 that may be made of any suitable material, and the supporting structure may be made of tubing as shown or of any suitable material.

It will be understood that modifications may be made in the design or arrangement of the parts without departing from the spirit of the invention.

What is claimed is:

1. In an adjustable seat support, the combination which comprises a pair of parallel tubular support frames having posts at the forward and rear ends with arcuate rearwardly and downwardly sloping upper bars connecting the upper ends of the posts, a rectangular shaped seat frame having substantially L-shaped parallel tubular side bars providing substantially horizontally disposed seat sections connected at their forward ends by a front bar and substantially vertically disposed back sections connected at their upper ends by a cross bar and said frames being connected at the rear by an intermediate bar, bearings pivotally connecting the seat frame through the front bar thereof to the forward ends of the upper bars of the support frames, and a crank bar having offset sections therein pivotally mounted on the seat frame and positioned with the offset intermediate part thereof resting upon the upper bars of the said support frames, said crank bar having a hand lever extended at one end for adjusting the position of the bar to raise and lower the rear portion of the seat frame.

2. In an adjustable seat support, the combination which comprises a pair of parallel tubular support frames having posts at the forward and rear ends with arcuate rearwardly and downwardly sloping upper bars connecting the upper ends of the posts, a rectangular shaped seat frame having substantially L-shaped parallel tubular side bars providing substantially horizontally disposed seat sections connected at their forward ends by a front bar and substantially vertically disposed back sections connected at their upper ends by a cross bar and said frames being connected at the rear by an intermediate bar, bearings pivotally connecting the seat frame through the front bar thereof to the forward ends of the upper bars of the support frames, a crank bar having offset sections therein pivotally mounted on the seat frame and positioned with the offset intermediate part thereof resting upon the upper bars of the said support frames, said crank bar having a hand lever extended at one end for adjusting the position of the bar to raise and lower the rear portion of the seat frame, said seat frame having a transverse bar extended between the side bars thereof, a bar providing a foot rest positioned against the rear surfaces of the posts at the rear of the support frames, and straps connecting the bar providing the foot rest to the transverse bar of the seat frame.

3. In an adjustable seat support, the combination which comprises a pair of parallel tubular support frames having posts at the forward and rear ends with arcuate rearwardly and downwardly sloping upper bars connecting the upper ends of the posts, a rectangular shaped seat frame having substantially L-shaped parallel tubular side bars providing substantially horizontally disposed seat sections connected at their forward ends by a front bar and substantially vertically disposed back sections connected at their upper ends by a cross bar and said frames being connected at the rear by an intermediate bar, bearings pivotally connecting the seat frame through the front bar thereof to the forward ends of the upper bars of the support frames, a crank bar having offset sections therein pivotally mounted on the seat frame and positioned with the offset intermediate part thereof resting upon the upper bars of the said support frames, said crank bar having a hand lever extended at one end for adjusting the position of the bar to raise and lower the rear portion of the seat frame, said seat frame having a transverse bar extended between the side bars thereof, a bar providing a foot rest positioned against the rear surfaces of the posts at the rear of the support frames, straps connecting the bar providing the foot rest to the transverse bar of the seat frame, and blocks positioned on the rear ends of the upper bars of the support frames positioned to be engaged by the offset intermediate section of the crank bar at the forward side and also by the bar providing the foot rest on the opposite side.

4. An adjustable seat comprising a base, a seat having a frame pivotally mounted on the forward end of the base, a bar pivotally mounted on the rear portion of the seat frame and having an offset section therein, blocks providing stops mounted on the base and having hook members extended from the rear ends thereof, means actuating the bar pivotally mounted on the rear part of the seat frame whereby the offset section thereof supports the seat in an upper position and permits the rear part of the seat to drop to a lower position, and a bar hanging by straps from the rear portion of the seat frame and positioned to engage the stop blocks to prevent forward swinging of the seat with the offset section of the bar pivotally mounted on the frame holding the seat in an upwardly extended position, the offset portion of the said bar holding said straps in tension with the rear portion of the seat in the upper position.

EDWARD M. MARTIN.

REFERENCES CITED

The following references are of record in the file of this patent:

UNITED STATES PATENTS

| Number | Name | Date |
|---|---|---|
| 54,869 | Cronk | May 22, 1866 |
| 293,833 | Winchester | Feb. 19, 1884 |
| 435,224 | Hindman | Aug. 26, 1890 |
| 1,674,846 | Street | June 26, 1928 |
| 2,321,716 | Wahlberg | June 15, 1943 |

FOREIGN PATENTS

| Number | Country | Date |
|---|---|---|
| 518,062 | Great Britain | Feb. 15, 1940 |